United States Patent [19]
Bennett, Jr.

[11] 3,777,132
[45] Dec. 4, 1973

[54] METHOD AND APPARATUS FOR OBTAINING THE RECIPROCAL OF A NUMBER AND THE QUOTIENT OF TWO NUMBERS

[75] Inventor: Walter Scott Bennett, Jr., Diamond Bar, Calif.

[73] Assignee: Burroughs Corporation, Detroit, Mich.

[22] Filed: Feb. 23, 1972

[21] Appl. No.: 228,536

[52] U.S. Cl. .............................. 235/164
[51] Int. Cl. .............................. G06f 7/52
[58] Field of Search .............................. 235/164

[56] References Cited

UNITED STATES PATENTS

| | | | |
|---|---|---|---|
| 3,633,018 | 1/1972 | Ling | 235/164 |
| 3,648,038 | 3/1972 | Sierra | 235/164 |

OTHER PUBLICATIONS

M. J. Flynn, "On Division by Functional Iteration," IEEE Trans. on Computers Vol. C–19, No. 8 Aug. 1970 pg. 702–706.

*Primary Examiner*—Malcolm A. Morrison
*Assistant Examiner*—David H. Malzahn
*Attorney*—Paul W. Fish et al.

[57] ABSTRACT

Binary division is performed by multiplying the reciprocal of a divisor by a dividend. The quotient is generated at the same time as the reciprocal of the divisor, the reciprocal being generated by a method and apparatus that multiplies the divisor by an evolving multiplier that forces the product to be a series of binary ones. Generation of the evolving multiplier is terminated at the end of one of its repeating periods, the multiplier thereby equaling the reciprocal of the divisor in all bits generated.

24 Claims, 6 Drawing Figures

| | | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
|---|---|---|---|---|---|---|---|---|---|---|---|---|---|---|
| $A_1$ | $a_1$ | 0 | 0 | 0 | 0 | 0 | 0 | 0 | 0 | 0 | 0 | 0 | 0 | 0 |
| | $b_1$ | 0 | 0 | 0 | 0 | 0 | 0 | 0 | 0 | 0 | 0 | 0 | 0 | 0 |
| | $c_{11}$ | 0 | 0 | 0 | 0 | 0 | 1 | 1 | 0 | 0 | 0 | 0 | 0 | 0 |
| | $c_{12}$ | 0 | 0 | 0 | 0 | 0 | 0 | 0 | 0 | 0 | 0 | 0 | 0 | 0 |
| | $s_1$ | 0 | 0 | 0 | 0 | 0 | 1 | 1 | 0 | 0 | 0 | 0 | 0 | 0 |
| $A_2$ | $a_2$ | 0 | 0 | 1 | 0 | 1 | 1 | 1 | 0 | 1 | 0 | 0 | 0 | 1 |
| | $b_2$ | 0 | 0 | 0 | 0 | 0 | 0 | 1 | 1 | 0 | 0 | 0 | 0 | 0 |
| | $c_{21}$ | 0 | 0 | 0 | 0 | 0 | 1 | 0 | 0 | 0 | 0 | 0 | 0 | 0 |
| | $c_{22}$ | 0 | 0 | 0 | 0 | 0 | 1 | 1 | 0 | 0 | 0 | 0 | 0 | 0 |
| | $s_2$ | 0 | 0 | 1 | 0 | 1 | 0 | 0 | 1 | 1 | 0 | 0 | 0 | 1 |
| $A_3$ | $a_3$ | 0 | 0 | 0 | 0 | 0 | 0 | 0 | 0 | 0 | 0 | 0 | 0 | 0 |
| | $b_3$ | 0 | 0 | 0 | 1 | 0 | 1 | 0 | 0 | 1 | 1 | 0 | 0 | 0 |
| | $c_{31}$ | 0 | 0 | 0 | 0 | 1 | 1 | 0 | 0 | 0 | 0 | 0 | 0 | 0 |
| | $c_{32}$ | 0 | 0 | 0 | 0 | 0 | 1 | 0 | 0 | 0 | 0 | 0 | 0 | 0 |
| | $s_3$ | 0 | 0 | 0 | 1 | 1 | 0 | 0 | 0 | 1 | 1 | 0 | 0 | 0 |
| $A_4$ | $a_4$ | 0 | 0 | 1 | 0 | 1 | 1 | 1 | 0 | 1 | 0 | 0 | 0 | 1 |
| | $b_4$ | 0 | 0 | 0 | 0 | 1 | 1 | 0 | 0 | 0 | 1 | 1 | 0 | 0 |
| | $c_{42}$ | 0 | 0 | 0 | 0 | 1 | 1 | 0 | 0 | 0 | 0 | 0 | 0 | 0 |
| | $s_4$ | 0 | 0 | 1 | 0 | 0 | 0 | 1 | 0 | 1 | 1 | 1 | 0 | 1 |

$t_n \rightarrow$

| STATES OF FLIP-FLOPS | | $t_0$ | $t_1$ | $t_2$ | $t_3$ | $t_4$ | $t_5$ | $t_6$ | $t_7$ | $t_8$ | $t_9$ | $t_{10}$ | $t_{11}$ | $t_{12}$ |
|---|---|---|---|---|---|---|---|---|---|---|---|---|---|---|
| $F_C$ | S-R | 0 | 0 | 0 | 0 | 0 | 0 | 0 | 0 | 0 | 0 | 0 | 0 | 0 |
| | 1 | 0 | 0 | 0 | 0 | 0 | 0 | 0 | 0 | 0 | 0 | 0 | 0 | 0 |
| | C | 1 | 1 | 1 | 1 | 1 | 1 | 1 | 1 | 1 | 1 | 1 | 1 | 1 |
| $F_1$ | S-R | 0 | 0 | 0 | 0 | 0 | 1 | 1 | 0 | 0 | 0 | 0 | 0 | 0 |
| | 1 | 0 | 0 | 0 | 0 | 0 | 0 | 1 | 1 | 0 | 0 | 0 | 0 | 0 |
| | C | 1 | 1 | 1 | 1 | 1 | 1 | 1 | 1 | 1 | 1 | 1 | 1 | 1 |
| $F_2$ | S-R | 0 | 0 | 1 | 0 | 1 | 0 | 0 | 1 | 1 | 0 | 0 | 0 | 1 |
| | 1 | 0 | 0 | 0 | 1 | 0 | 1 | 0 | 0 | 1 | 1 | 0 | 0 | 0 |
| | C | 1 | 1 | 1 | 1 | 1 | 1 | 1 | 1 | 1 | 1 | 1 | 1 | 1 |
| $F_3$ | S-R | 0 | 0 | 0 | 1 | 1 | 0 | 0 | 0 | 1 | 1 | 0 | 0 | 0 |
| | 1 | 0 | 0 | 0 | 0 | 1 | 1 | 0 | 0 | 0 | 1 | 1 | 0 | 0 |
| | C | 1 | 1 | 1 | 1 | 1 | 1 | 1 | 1 | 1 | 1 | 1 | 1 | 1 |
| $F_4$ | S-R | 0 | 0 | 1 | 0 | 0 | 0 | 1 | 0 | 1 | 1 | 1 | 0 | 1 |
| | 1 | 0 | 0 | 0 | 1 | 0 | 0 | 0 | 1 | 0 | 1 | 1 | 1 | 0 |
| | 0 | 1 | 1 | 1 | 0 | 1 | 1 | 1 | 0 | 1 | 0 | 0 | 0 | 1 |
| | C | 1 | 1 | 1 | 1 | 1 | 1 | 1 | 1 | 1 | 1 | 1 | 1 | 1 |

FIG. 5B

METHOD AND APPARATUS FOR OBTAINING THE RECIPROCAL OF A NUMBER AND THE QUOTIENT OF TWO NUMBERS

BACKGROUND OF THE INVENTION

The present invention relates to a method and apparatus for performing division between two binary numbers and more particularly pertains to a new improved method and apparatus for performing division in the binary number system which forms the quotient by generating the reciprocal of the binary divisor and multiplying the binary dividend by the reciprocal of the binary divisor.

In the field of binary number machine computation, the most common technique of dividing one binary number by another is to successively subtract the divisor from the dividend. The apparatus to implement this method of division however, is quite costly, cumbersome and slow.

To eliminate the shortcomings of the subtraction method, a machine technique was devised which first obtained the two's complement or, more preferably, the one's complement of a divisor and then successively added it to the dividend. The addition of the complement of a divisor is equivalent to the subtraction of a divisor. Two variations of this method are now in use, the restoring method and the non-restoring method, the non-restoring method being the faster of the two.

To further increase the speed of the division operation prior art apparatus has been developed to generate more than one quotient bit at each addition stage in the calculation cycle.

These methods of division by the complementing technique are still quite cumbersome in that supervision control is required at each successive addition stage to determine the sign of the remainder, whenever there is a remainder.

To eliminate the need for supervision at the intermediate stages of the division operation and to increase the speed of the entire division operation, prior art apparatus has been developed, R. R. Goldschmidt et al., U.S. Pat. No. 3,508,038, which forms a quotient by multiplying a dividend by the reciprocal of the divisor. The Goldschmidt et al method contemplates using a reciprocal look-up table from which an approximate reciprocal of a divisor is obtained. This approximate reciprocal from the look-up table is multiplied by the given dividend to generate a first intermediate quotient. A first approximation of one is formed by multiplying the given divisor by its reciprocal from the look-up table. A first reciprocal of said first approximation of one is then formed by complementing the first approximation of one. A second intermediate quotient is formed by multiplying the first intermediate quotient by the first reciprocal. A second approximation of one is formed by multiplying the first approximation of one by the first reciprocal. A second reciprocal is then formed by complementing the second approximation of one. This second reciprocal can then be multiplied by the second intermediate quotient to generate the third intermediate quotient. Calculation may stop at any time an intermediate quotient is generated.

The accuracy of the approximate quotient depends on the number of times the above steps are repeated, since at each step the approximations of one more closely approach one thereby indicating that the reciprocal of the given divisor is becoming more accurate, forcing the quotient to be more accurate. In essence, the technique of the Goldschmidt et al. patent is to take on approximate reciprocal of a divisor from a look-up table and by the above recited method produce a quotient to the accuracy desired.

This technique is both fast and requires little supervision control once started. However, such a method of division is quite complex and requires a great deal of expensive hardware to implement it.

SUMMARY OF THE INVENTION

It is therefore an object of this invention to provide a new and simplified method of determining the reciprocal of a binary number.

A further object of this invention is to provide a minimum of expensive hardware to implement the determination of the reciprocal of a binary number in accordance with the above method.

It is yet another object of this invention to provide a new and simplified method of determining the binary quotient when one binary number is divided by another.

A still further object of this invention is to provide a minimum of hardware to implement the determination of the binary quotient in accordance with the above method.

These objects and the general purpose of this invention are accomplished by multiplying an odd binary integer which is a divisor by an evolving number that forces the product of the two to be a series of binary ones, the evolving number as it is evolved being multiplied with a dividend to form the quotient. It is axiomatic that any binary integer multiplied by its reciprocal will always generate a product of unity and that an infinite series of binary ones to the right of the binary point equals unity. Therefore, the reciprocal of any odd binary integer can be determined by controlling the multiplication of the odd binary integer by its unknown, but evolving, reciprocal so the product of the two is a series of binary ones, the number of binary ones in the series being n times the number of binary bits in one period of the evolving reciprocal. The reciprocals of even binary integers, even fractional binary numbers and even mixed binary numbers can be determined by the same method if they are normalized to an odd binary integer times the appropriate power pf two before the reciprocal determining operation. By forming the reciprocal of a binary divisor in this manner, the binary quotient in a division operation can be generated by multiplying the binary dividend by the reciprocal of the binary divisor as each bit of the reciprocal of the divisor is generated.

BRIEF DESCRIPTION OF THE DRAWINGS

The exact nature of this invention as well as other objects and advantages thereof will be readily apparent upon consideration of the following specification relating to the attached drawings wherein like reference numerals designate like elements and in which:

FIG. 5A and 5B is a pulse and state diagram illustrating the states of the elements in the reciprocal generator during one cycle of operation for a specific binary number.

DESCRIPTION OF THE PREFERRED EMBODIMENTS

Figure 1:
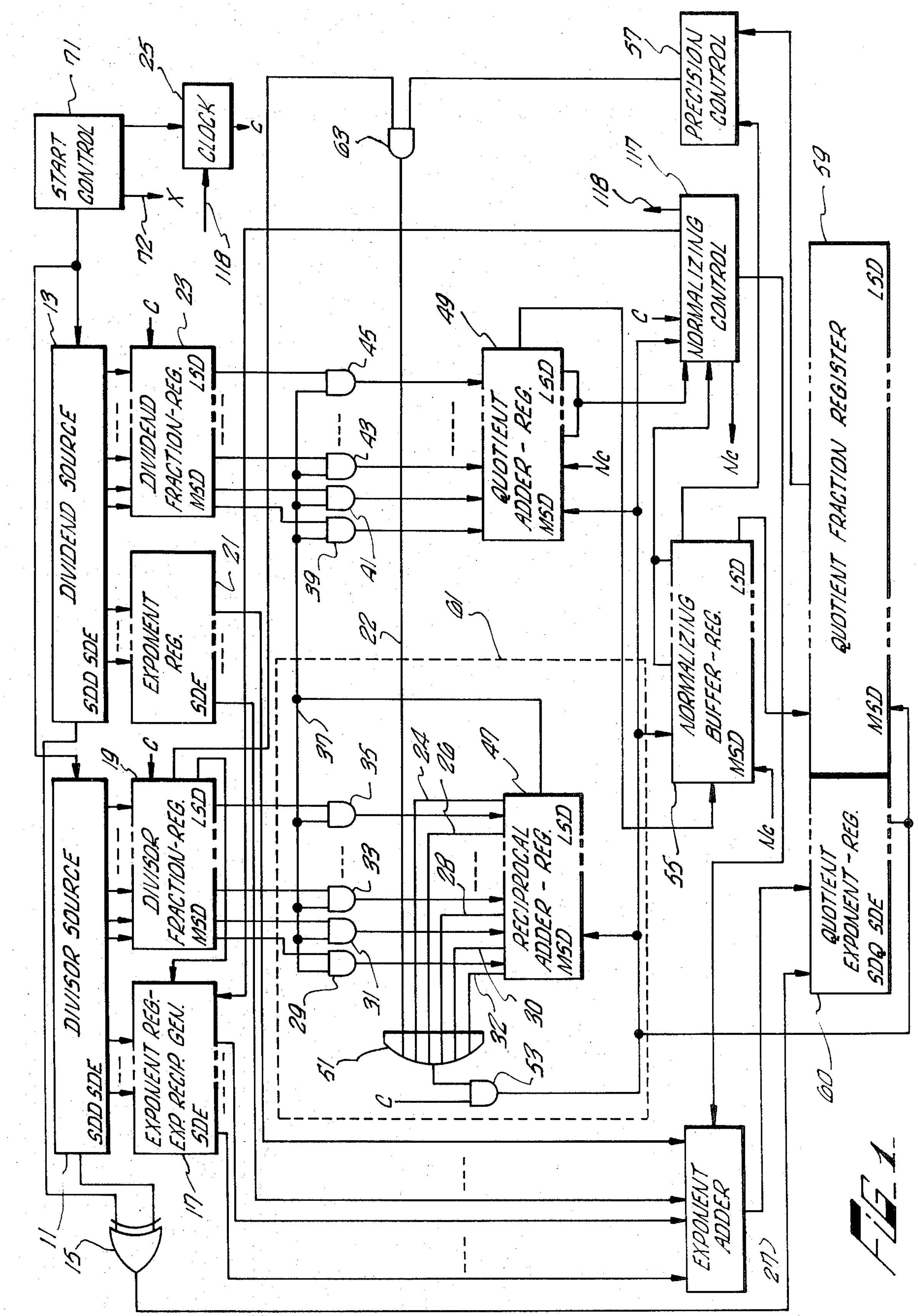
FIG. 1 is a block diagram of a preferred embodiment of the invention.

Before describing the specific embodiments of the invention, perhaps a discussion of the theoretical bases of the invention will provide a better comprehension of the invention and its specific embodiments.

It has been discovered that the reciprocal of any odd binary integer is a periodic binary fraction of infinite length with the first period starting immediately to the right of the binary point. To show that this is true for a specific example, take the decimal number of eleven in binary form and divide it into one:

```
         .0001011101....
1011 | 1.0000000000....
         1011
         ----
         10100
          1011
         -----
          10010
           1011
          -----
            1110
            1011
            ----
             1100
             1011
             ----
                1.....
                .
                .
                .
                .
```

In this example, the first ten digit positions of the quotient forms the length of the period that is infinitely repeated. This is true because the generation of the tenth digit causes a remainder of one which equals the dividend, thereby starting generation of the period over again.

Having seen that the division of an odd binary integer into one will create a binary fraction that is a periodic infinite series with the period starting immediately to the right of the binary point for a specific example, that this is true for all odd binary integers is established by the following two part proof.

That the reciprocal of any odd binary integer is periodic will be shown first.

1. It is axiomatic that a power of two (one is the power of two to the zero exponent) cannot be divided by an odd binary integer larger than one without having a non-zero remainder.
2. It is axiomatic that all remainders must be less than the odd binary integer that is the divisor.
3. Since the binary integer which is the divisor is finite and all remainders must be less than the divisor, this implies that there must be a finite number of distinct remainders.
4. Since there are a finite number of distinct remainders, some remainders must occur again after a finite number of subtractions; the first recurrence of a remainder other than one, or the first occurrence of the remainder one (which is equal to the dividend) establishes the first period.

Having seen that the division of any even binary integer by an odd binary integer will produce a quotient that is periodic, that the first period of the periodic quotient of one divided by any odd binary integer starts immediately to the right of the binary point will now be shown.

1. Since the divisor (subtrahend) is odd and the dividend (minuend) is even, impliedly, the difference between the two is in each case odd; all remainders are therefore odd.
2. It is axiomatic that the reciprocal of any odd binary integer has a dividend that is always one.
3. Knowing that the reciprocal of an odd binary integer is a periodic binary fraction, suppose that some remainder R occurs a second time before the occurrence of the remainder one and further suppose that R is the first remaider to recur. For this to be true R must be the result of subtracting the divisor from two minuends which are equal but are obtained from different remainders, $R_1$ and $R_2$.
4. Let us call these minuends $M_1 = 2^h R_1$ and $M_2 = 2^k R_2$.
5. Since $M_1$ must equal $M_2$ this implies that $2^h R_1$ must equal $2^k R_2$. However, $R_1$ cannot equal $R_2$ and this implies that the exponent h cannot equal the exponent $k$.
6. Let us arbitrarily suppose that $h$ is greater than $k$, therefore: $(2^{h-k}) R_1 = R_2$; which implies that $R_2$ is even because it has for a factor a positive integral power of two.
7. However, we have shown in our first step that all remainders must be odd. Therefore, no R will recur before the remainder one occurs.

Therefore the reciprocal of any odd binary integer is an infinite periodic binary fraction with the first period starting immediately to the right of the binary point.

It is well known that in the binary number system 1.000 . . . . = 0.111 . . . Because of this relationship, it follows that an odd binary integer may be divided into one in the form 1.000 . . . or in the form 0.111 . . . , both forms giving the same result, a reciprocal of the odd binary integer that is an infinite periodic binary fraction with the first period starting immediately to the right of the binary point. For example:

```
         .0001011101
1011 | 0.1111111111
         1011
         ----
         10011
          1011
         -----
          10001
           1011
          -----
            1101
            1011
            ----
             1011
             1011
             ----
                0.....
                .
                .
                .
```

From this example, it is clear that 1011 (binary eleven) divides into 0.11111111110000 . . . evenly, since there is no remainder after the tenth step. If division was continued, the quotient would repeat itself and there would be a zero remainder at the 20 step, and so on for every integral multiple of 10. 10, therefore, is the period length of one-eleventh.

Conversely, it follows that 1011 × 0.0001011101 = 0.1111111111, and that 1011 × 0.00010111010001011101 = 0.11111111111111111111, and so on. For Example:

```
         1011
   .0001011101
   -----------
         1011
        0000
       1011
      1011
     1011
    0000
   1011
  0000
 0000
0000
-------------
0001111111111
```

Thus if 1011 multiplied by appropriate powers of two can be successively subtracted from a certain length series of ones and come out even, then the same length series of ones will result as a product if 1011, multiplied by appropriate powers of two, is successively added. In our example, .0001011101 is the appropriate powers of two. This fraction, of course, is the quotient in our division example and the multiplier in our multiplication example. This fraction is the reciprocal of 1011.

The reciprocal of any odd binary integer can be found by a sequential process in which the odd binary integer is added to intermediate sums to force the product to be an unbroken finite sequence of ones. For our example, there are 10 *n* ones, *n* being any positive integer.

For other odd binary integers, however, the periodicity may be different, in other words, different from 10 *n*. Since the multiplier is generated from least significant to most significant digit, knowing that the binary point belongs immediately to the left of the most significant one in a particular period of the series of ones which is our product, identifies the position of the binary point in the multiplier. In other words, the number of digit positions to the right of the multiplier binary point (the reciprocal being sought which is expressed in fractional form) equals the number of ones in one period, or any positive integer multiple thereof, of the product.

The general expression for this concept is: for every odd binary integer $m$ there exists a positive integer $P < |m|$ such that $m$ divides $2^p - 1$. This general expression follows from a theorem of Euler which staes that for any prime p and any integer $n$, if $p$ does not divide $n$, then $p^k$ divides $n^{[p^k - p^{(k-1)}]-1}$ for any positive integer $k$.

The apparatus of the preferred embodiment, as will be seen, is structured to detect the occurrence of the end of each period, as long as the apparatus is functioning. The indicia that triggers the apparatus is inherent to the relationships discussed above. Because any odd binary integer will divide into a string of ones evenly at the conclusion of each period of its reciprocal, the remainder at the end of each period is zero. This relationship causes a reciprocal adder-register 47 to go to zero at the end of each period, as will be explained. The detection of this condition in the reciprocal adder-register indicates that a period or a multiple of periods have been generated which are correct to each digit position. The binary point may then be placed to the left of the most significant digit of the reciprocal generated.

Knowing these relationships, a method for generating the reciprocal of any odd binary integer may be implemented and used to obtain a quotient by multiplying the bits of the reciprocal of the divisor times the dividend. This technique may be used in an embodiment that can handle mixed numbers of varying sizes for the divisor and dividend by utilizing the floating binary point concept.

A floating binary point dividing system using a reciprocal generator and a multiplier to determine the quotient is shown in FIG. 1. In this floating binary point dividing system, an exponent register — exponent reciprocal generator 17 and a divisor fraction register 19 receive a binary divisor from a divisor source 11. The divisor source may be the memory of a computer system or peripheral equipment or any other source which produces or presents a binary number in the standard floating binary point format.

An example of such a format is:

| x | x | xx . . . . x | . xx . . . . . . . x |
|---|---|---|---|

The first digit, at the extreme left of the computer word, represents the mantissa or binary fraction sign. The second digit, to the right of the mantissa sign digit, represents the exponent sign. The plurality of digits that follow the exponent sign digit represent the exponent (it must be remembered that the exponent is of the base two since we are working in the binary system). The digits that follow the exponent digits represent the mantissa or the fractional part of the binary number. The binary point is conceptually placed directly to the left of the first digit in this section of the computer word. Standard convention dictates that a binary one in the location of the mantissa sign digit indicates that the mantissa is negative while binary zero indicates that it is positive. This convention may also be utilized to represent the sign of the exponent. However, in the particular embodiment of this invention it was discovered to be more convenient to utilize the convention of a binary one representing a positive exponent and a binary zero representing a negative exponent.

A dividend source 13 (FIG. 1) delivers a dividend to a dividend-fraction register 23 and dividend exponent register 21 in the same format. The exponent register-exponent reciprocal generator 17 receives the binary bits representing the sign of the exponent and the quantity of the exponent of the divisor. The divisor fraction register 19 receives the binary bits representing the fractional portion of the divisor. This fractional portion, is already normalized into the standard floating binary point format, in that the first bit to the right of the binary point, the most significant digit, is a binary one.

The dividend exponent register 21 receives and holds the dividend exponent sign digit and the digits representing the quantiy of the exponent of the dividend. The dividend fraction register 23 holds the fractional portion of the dividend. Here again, the fractional portion is received in normalized form.

Upon initiation of a start control unit 71, a clock 25 is started influencing the divisor source 11 and the dividend source 13 to deposit the binary divisor and binary dividend into the respective divisor and dividend registers.

If the divisor fraction register 19 has been loaded with a binary fraction that has a zero in its least significant digit position, the divisor fraction register is adapted to automatically shift the fraction to the right until a binary one is shifted into the least significant digit position. The number of shifts that it takes to place a one in the least significant digit position are transmitted and counted by the exponent register-exponent reciprocal generator 17, the exponent stored therein being increased accordingly.

A reciprocal generator 61, contained within the dashed lines, handles the binary bits representing the fractional portion of the divisor as a binary integer. Since the reciprocal generator will correctly generate only reciprocals of odd binary integers, the above shifting to the right is necessary to create an apparent odd binary integer from an apparent even binary integer.

The reciprocal of the exponent stored in exponent register — exponent reciprocal generator 17 is generated immediately after the least significant digit position of the divisor fraction register 19 contains a one. The reciprocal of the exponent is obtained by taking its two's complement which is in effect multiplication by minus one. Apparatus to implement the obtaining of the two's complement of a binary number may simply be apparatus that generates the inverse of each bit in that binary number thus forming its one's complement and then adding a binary one to the one's complement formed.

If the format for the exponent is such that a zero bit represents a minus exponent and a one bit represents a plus exponent, that is a 100 . . . 001 would represent a plus one, a 100 . . . 00 represents zero, and 011 . . . 11 represents a minus one, then no extra hardware would be required to insure that the sign of the reciprocal of the exponent is correct. Simply taking the two's complement of an exponent biased in this form will develop the correct sign. It should be realized, however, that other formats may be used. For example, a one in the first digit representing a negative exponent and a zero in the first digit representing a positive exponent, could be used just as well by simply adding logic circuitry to insure that the sign of the reciprocal is correct after the two's complement is taken.

The reciprocal of the exponent in register 17 and the exponent in register 21, after the reciprocal has been formed in register 17, are added together with a normalizing count from normalizing control 117, by exponent adder 27, in a conventional manner, to produce the exponent for the quotient. The output of the exponent adder 27 is deposited in the quotient exponent register 60 after the fractional portion of the quotient has been formed and normalized in the manner explained below. Exponent adder 27 may be very simply implemented as is well known to a person of ordinary skill in the art. In the embodiment of FIG. 1, it only adds three binary numbers together.

The fractional portion of the quotient is formed simultaneously with the reciprocal of the divisor, before the exponent of the quotient is formed. The sign of the fractional portion of the quotient is determined by Exclusive OR gate 15 which senses the sign of the fractional portion of the divisor and the sign of the fractional portion of the dividend. It should be remembered at this point that the convention that a one represents a negative and a zero a positive is used to indicate the sign of the fractional parts of the divisor, dividend and quotient. The Exclusive OR gate 15 will generate a binary one whenever one of the inputs to the OR gate is a binary one and a binary zero at all other times. Therefore, the sign digit of the quotient will indicate a negative quotient whenever the signs of the divisor and dividend are not alike. The quotient exponent register 60 therefore will contain the sign digit for the fractional portion of the quotient and the sign digit for the exponent of the quotient as well as the quotient exponent. A quotient fraction register 59 will contain the fractional portion of the quotient, normalized so the most significant digit of that quotient, immediately to the right of the binary point, is a binary one.

To obtain the fractional part of the quotient, the reciprocal generator 61, shown within the dash lines, and a quotient adder-register 49 work in conjunction. The reciprocal generator 61 forms a reciprocal of the fractional part of the divisor and the quotient adder register 49 forms the fractional part of the quotient, as dictated by the bits of the reciprocal generated. Since the operation is a multiplication operation, the fractional part of the quotient could also be called the product of the fractional part of the reciprocal of the divisor and the fractional part of the dividend.

The output of reciprocal adder register 47 is a binary one after initial clearing by the start control unit 71 over clear line 72 thereby causing point 37 to carry a binary one and enable AND gates 29, 31. 33. 35, 39, 41, 43, 45. It should be noted that the number of AND gates used are only illustrative, an attempt having been made to show that any number, depending on the size of the binary words, may be used. This is also true for the size of the registers. Having point 37 at a binary one will cause the information contained in divisor fraction-register 19 and dividend fraction-register 23 to respectively drop into reciprocal adder-register 47 and quotient adder-register 49. If point 37 is at any time a binary zero, of course, the digits in divisor fraction-resister 19 and dividend fraction-register 23 will not be entered into the adder registers.

As will be explained later, the sequence of binary bits appearing at point 37, because they are generated by reciprocal adder-register 47, are the binary bits, appearing in the order of least significance to most significance, of the reciprocal of the fractional part of the divisor that was loaded into divisor fraction-register 19. Using these reciprocal digits in that order to enable AND gates 39, 41, 43, 45 causes a series of additions to be performed in quotient adder-register 49, the result of which is the fractional part of the quotient. Quotient adder-register 49 generates this fractional part in a bit serial fashion and loads the bits into a normalizing buffer register 55 in the digit order of least significance to most significance.

A multiple input OR gate 51, monitors the reciprocal adder-register 47 and has its output tied to an AND gate 53 which generates the clock pulses for reciprocal adder register 47, quotient adder register 49, normalizing buffer register 55, and quotient register 59. The AND gate 53 is enabled only when one of the multiple inputs to OR gate 51 is a binary one. Prior to the start of a computation cycle, of course, the inputs 22, 24, 26, 28, 30, 32 to OR gate 51 are zero. Upon the fractional part of a divisor being loaded into the reciprocal adder-register 47, however, at least one of the inputs 24, 26, 28, 30, 32 will become a binary one thereby initiating the calculation cycle. The calculation will continue, in a manner to be explained, until all the inputs 22, 24, 26, 28, 30, and 32 to the OR gate 51 become zero again.

Inputs 24, 26, 28, 30, 32 to OR gate 51 will become zero upon completion of the generation of the first period of the reciprocal of the mantissa of the divisor and upon the completion of each period thereafter. Calculation would stop at the completion of the generation of the first period if input 22 were also a zero at this time. However, a percision control unit 57 which receives signals from the normalizing buffer register 55 and the quotient register 59 determines what precision is desired. If further precision is desired, a binary one will be supplied to AND gate 63 at this time. The output of AND gate 63 will be a binary one because the other input to AND gate 63 is the least significant digit of divisor register 19 which is always a one after calculation starts. This prevents the calculation from stopping until the desired precision has been obtained as indicated by the inputs to the precision control 57.

If further precision is not desired, precision control 57, at this time, would not send a binary one to the input of AND gate 63 and therefore, the output of multiple OR gate 51 would become zero stopping the calculation cycle. The precision control unit 57 may be simply implemented by logic circuitry such as a pair of J-K flip-flops and a pair of AND gates.

At the conclusion of the calculation cycle the quotient may be located in the normalizing buffer-register 55 and partly in quotient adder-register 49. If the quotient happens to be a fraction, as would be the case if the fractional part of the divisor was larger than the fractional part of the dividend, only the normalizing buffer-register 55 would contain the quotient. If the quotient is a whole number plus a fraction, as would be the case if the fractional part of the divisor were smaller than the fractional part of the dividend, the fractional part of the quotient would be in the normalizing buffer-register 55 and the integral part in the quotient adder-register 49.

In order to present the quotient in the standard floating binary point format, that is, the same format in which the divisor and dividend were received, so the quotient may be utilized in the same apparatus from which the divisor and dividend were received or in other apparatus utilizing floating binary point arithmetic, normalizing control unit 117 shifts the generated fractional part of the quotient into the quotient fraction-register 59 until the most significant bit therein is a binary one. The exponent of the quotient is increased accordingly to preserve the value of the quotient.

The logic circuitry of the normalizing control circuit 117 is seen as well within the purview of a person of ordinary skill in the art to design, therefore, only the basic function of such circuitry will be described here. Upon completion of the quotient calculation, the fractional part of the quotient is in normalizing buffer register 55 and the integral part is in quotient adder-register 40. Normalizing control circuit 117 thereupon begins to serially shift the binary bits stored in normalizing register 55 and quotient adder-register 49 into quotient fraction register 59. The clock signals for accomplishing this shifting are supplied to quotient adder register 49 and normalizing buffer register 55 by normalizing control unit 117 over clock line Nc. The normalizing control unit 117 senses the states of all the bit positions in the quotient adder-register 49 and normalizing buffer-register 55. Normalizing control unit 117 counts the number of shifts required to cause all the bit positions in the quotient-adder register 49 to become zero and increments the divisor exponent register-exponent reciprocal generator 17 this amount. Also, normalizing control circuit 117 knows how many its long normalizing buffer register 55 is. When normalizing buffer register 55, sensed by normalizing control unit 117, reaches a zero state in each of its binary bit positions, normalizing control unit 117 will generate an output count that is the negative difference between the bit length of the buffer register and the actual shift count. That is, the actual shift count minus the bit length of the buffer register will always produce a count that is less than zero and therefore in exponent notation according to the convention chosen above. This count is added to the sum of the exponents of the reciprocal of the divisor and dividend in the exponent adder. This count is nonzero only if the normalizing buffer register 55 reaches the zero state in all its bit positions before the number of shifts equal to the capacity of the register have occurred.

Figure 2:
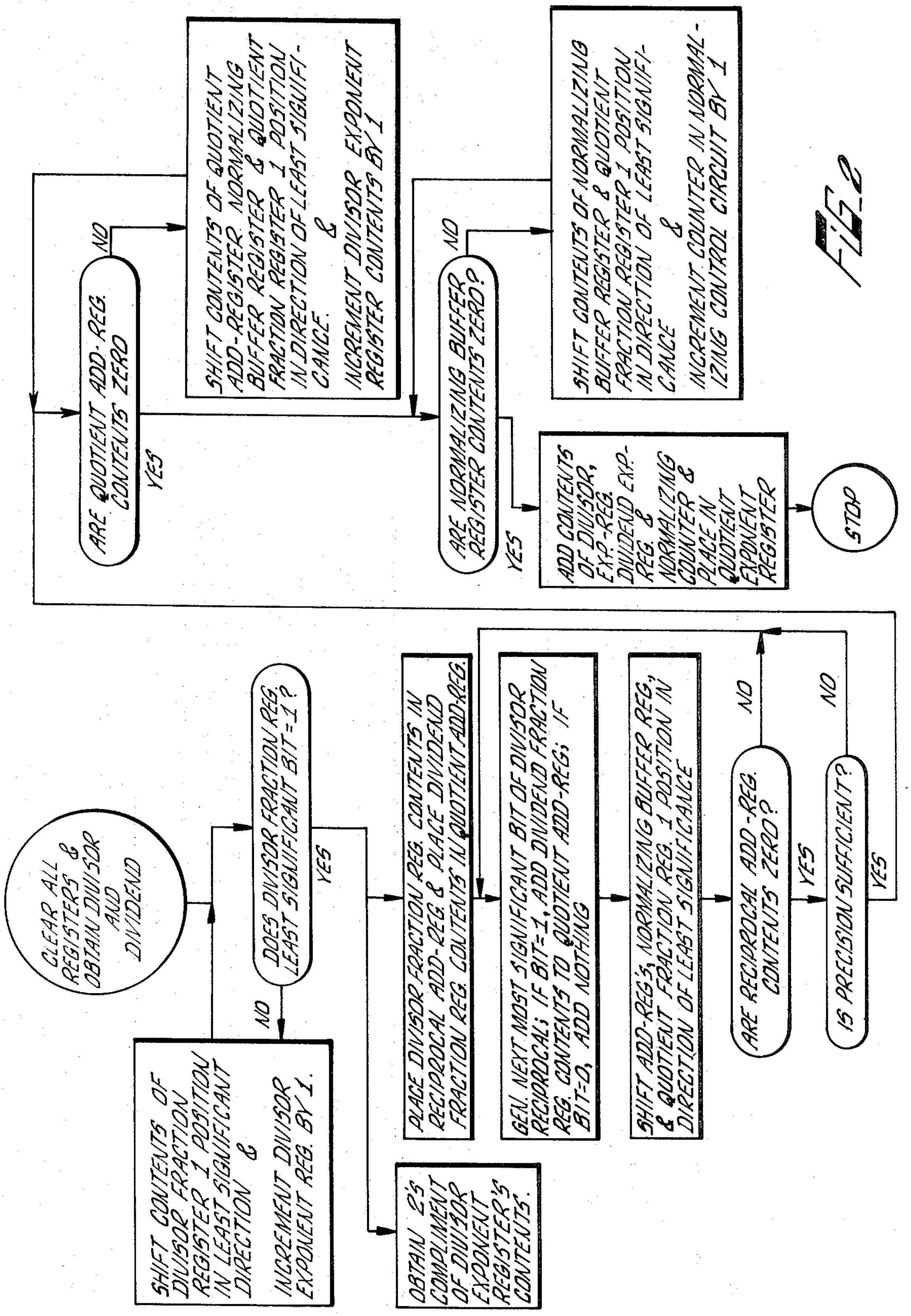
FIG. 2 is a flow diagram illustrating the general operation of the embodiment of FIG. 1.

For a more thorough understanding of the operation of the binary divider of this invention and particularly the preferred embodiment of FIG. 1, reference should be made to the flow diagram of FIG. 2. This flow diagram is a self-explanatory illustration of the general function of the apparatus of FIG. 1.

Figure 3:
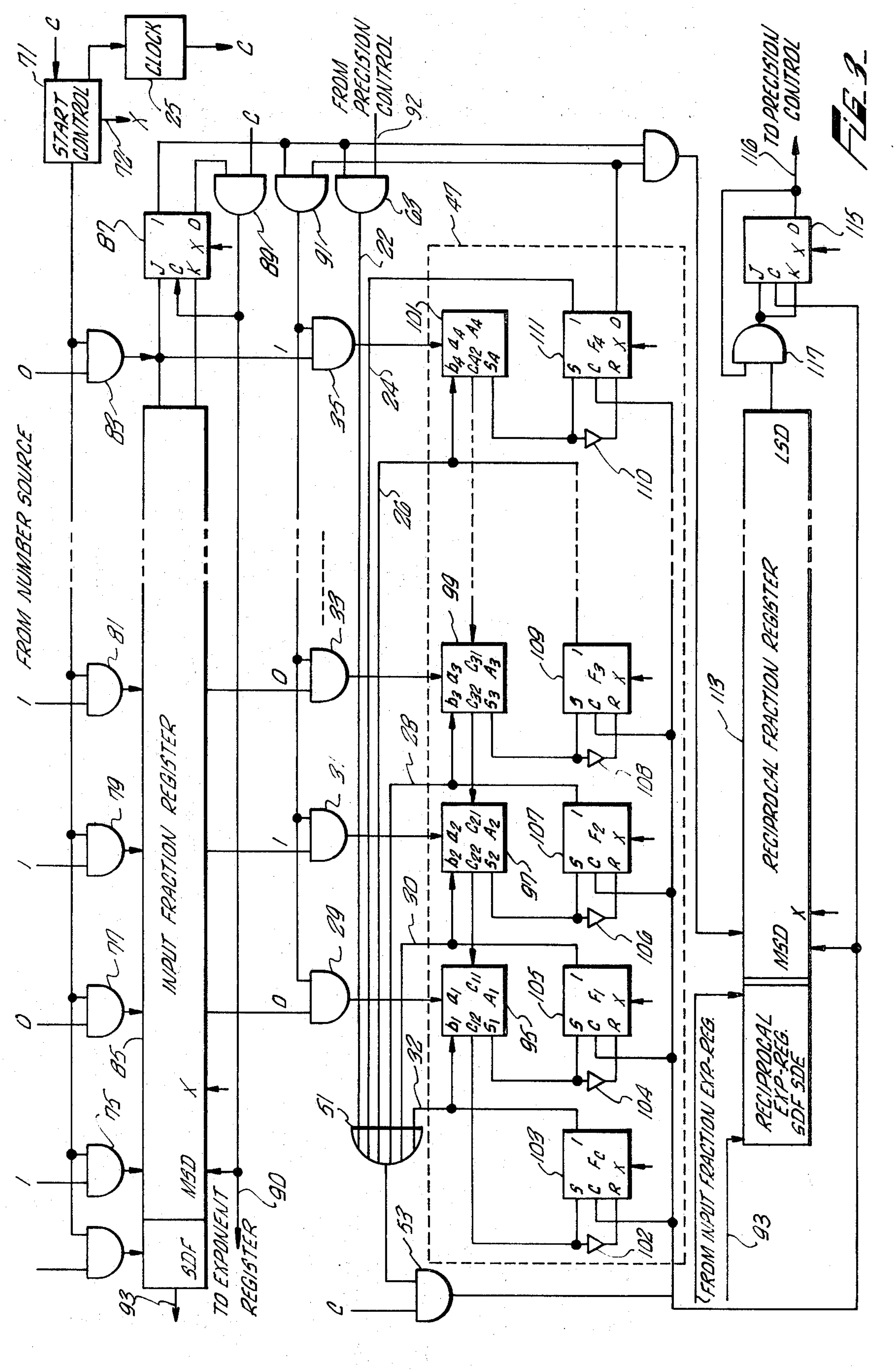
FIG. 3 is a block diagram of a preferred embodiment of a divisor reciprocal generator utilized in the dividing apparatus of FIG. 1.
Figure 4:
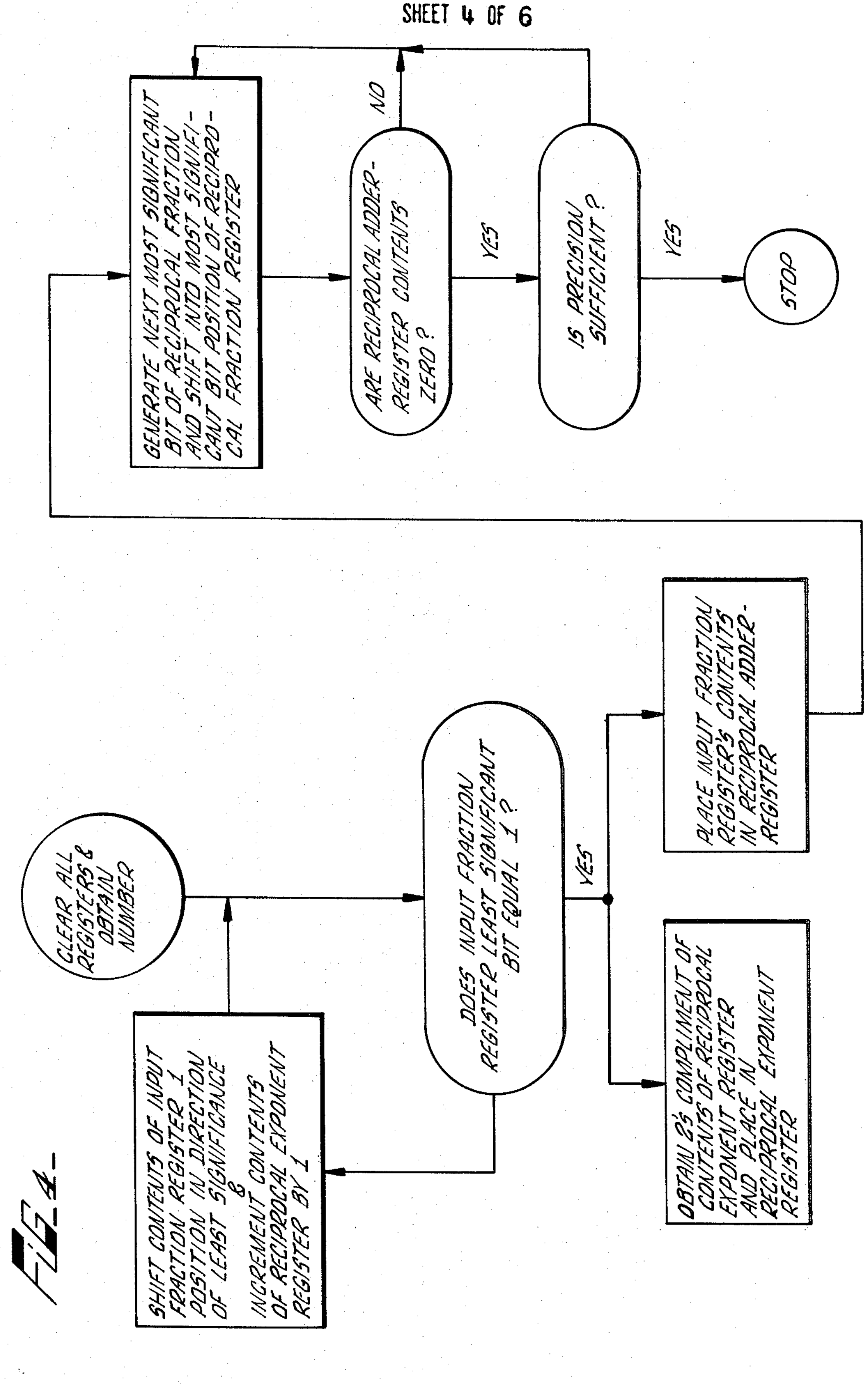
FIG. 4 is a flow diagram illustrating the general operation of the reciprocal generator of FIG. 3.
Figure 5A:
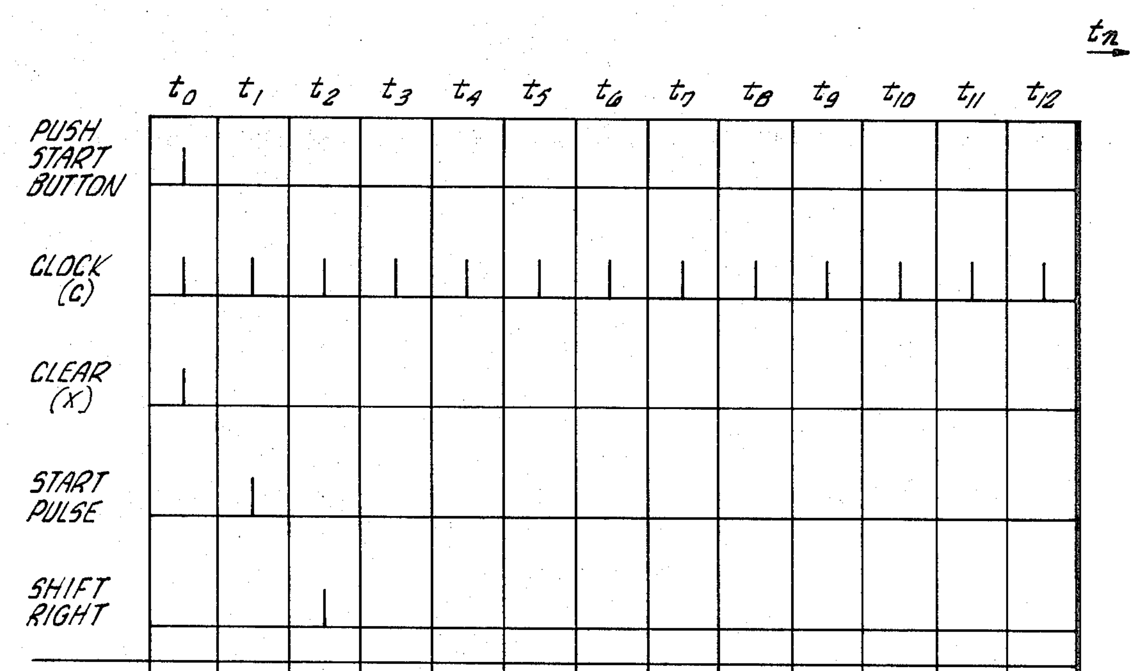

The operation of the reciprocal generator 61 of FIG. 1 will be more clearly understood upon reference to FIG. 3 which illustrates a preferred embodiment of the reciprocal generator, along with FIG. 4 which is a flow diagram of its operation, and FIG. 5A and 5B which is a state diagram of its elements for one cycle of operation for a particular example.

Referring now to FIG. 3, the fractional part of a floating binary poi number or a fractional number or a binary integer may be received from some number source by an input fraction register 85 through AND gates 75, 77, 79, 81 and 83. Only five input AND gates for the fractional portion have been shown but they have been illustrated in a manner to indicate that as many as is desired, depending on the size of the binary word utilized, may be used. A start control 71, which was explained earlier, enables AND gates 75 through 83 to cause the word from the number source to be loaded into the input fraction register 85. In addition, the start control 71 delivers a clear signal over line 72 to all the flip-flops and registers and starts a clock 25. The specific sequence of clock starting, clear pulse generating, and start pulse generating is shown at the top of FIG. 5A, the clear pulse is generated and the clock is started the instant the start control is actuated while the start pulse is generated during the next clock time.

A J-K flip-flop 87 which receives the least significant digit of the input fraction and digits shifted from the least significant digit position of input fraction register 85, in conjunction with AND gate 89 causes the binary number loaded into input fraction register 85 to be shifted to the right as many times as is necessary to place a binary one into the J-K flip-flop 87. In the case of a floating binary point machine, the number of shifts to the right would be transmitted to the exponent register one by one where the exponent would be compensated accordingly. This procedure of shifting the binary input fraction toward the least significant digit position until a binary one is located in that position, which for convenience is called odd number normalization, in effect changes or alters an apparent (apparent to the reciprocal generator) even binary integer into an apparent odd binary integer without affecting its actual value, external to the reciprocal generator.

Following a one being shifted into the J-K flip-flop 87, it has a binary one at its one output, thereby enabling AND gate 91 which causes AND gates 29, 31, 33, 35 to be enabled. Here again the number of AND gates 29 to 35 will depend upon the length of the binary word used. The enabling of these AND gates causes the binary number in input fraction register 85, which is now in its odd normalized form, to be loaded into reciprocal adder-register 47, shown within the dash lines. Reciprocal adder-register 47 consists of a plurality of full adders and a shift register comprised of inverters and, set-reset flip-flops. The number of full adders, inverters, and flip-flops will depend upon the length of the binary word used. In the preferred embodiment, as shown in FIG. 3, there are four full adders 95, 97, 99 and 101 and five shift register flip-flops 103, 105, 107, 109 and 111. The flip-flops are paired with the adders, the extra flip-flop 103 being used as a carry store.

A multiple input OR gate 51 monitors the outputs of all the flip-flops 103, 105, 107, 109, 111 in adder register 47 and additionally has an input which may be controlled by the precision control unit 57 (FIG. 1). Reciprocal adder-register 47 is enabled only when the output of multiple input OR gate 51 is a binary one, that is, there is at least one binary one input to OR gate 51. When all inputs 22, 24, 26, 28, 30, and 32 to OR gate 51 are zero the output of OR gate 51 will be zero thereby causing reciprocal adder register 47, reciprocal fraction-register 113 and J-K flip-flop 115 to stop operation.

The signal at the zero output of $F_4$ flip-flop 111 represents a digit of the reciprocal of the binary number loaded into input fraction register 85 and J-K flip-flop 87 after reciprocal adder register 47 has been enabled. Therefore, the signal appearing at the zero output of $F_4$ flip-flop 111 at the time that a clock pulse is supplied to the reciprocal adder register 47 by AND gate 53 will represent the least significant digit of the reciprocal of the binary number loaded into input fraction register 85. The signal appearing at the zero output of $F_4$ flip-flop 111 at the next clock time will represent the second least significant digit of the reciprocal of the number loaded into the input fraction register 85 and so on. Reciprocal fraction-register 113 is loaded serially from the most significant digit end.

The length of reciprocal fraction-register 113, the number of binary bits it is capable of storing, as the length of input fraction register 85, is dependent upon the length of the binary word or number utilized. Generally speaking, the length of output fraction register 113 will be longer or have a greater capacity than input fraction register 85.

The digits of the reciprocal of the binary number loaded into input fraction register 85 and J-K flip-flop 87 will be generated as long as at least one of the inputs to OR gate 51 is a binary one. It must be remembered that at the end of each period of the reciprocal being generated, because of the unique nature of the reciprocal of odd binary integers, the outputs of each of the flip-flops 103, 105, 107, 109 and 111 will be zero. Calculation may stop at this point if desired or may continue to generate another period, depending on what signal is received from the precision control over line 92.

The partcular embodiment of FIG. 3 was designed to generate a minimum of one period of the reciprocal without the use of a precision control circuit and to generate as many periods as desired precision requires with the use of a precision control circuit and additional reciprocal fraction register space.

When reciprocal fraction register 113 has been loaded so that a binary one appears at the least significant digit position of the register, J-K flip-flop 115 is enabled so that with the next clock its zero output becomes zero thereby activating the precision control, or if no precision control is desired deactivating AND gate 63. If no precision control is desired, lead 116 would be connected directly to lead 92. Either way, the ultimate effect is that the signal on input lead 22 to OR gate 51 becomes zero. Subsequently, when the input leads 24, 26, 28, 30 and 32 become zero, the calculation will cease. No matter how many digit positions there are in the reciprocal fraction register 113, the first digit of the period of the reciprocal generated will always be in the most significant digit position in the reciprocal fraction register 113 at the time the calculation ceases.

To facilitate a better understanding of the reciprocal generating apparatus shown in FIG, 3, a specific example of the operation of the reciprocal generator will now be given.

Let us assume for illustration's sake that the binary number 1011 (11 in the decimal system) is supplied from a number source to input fraction register 85 and J-K flip-flop 87. Let us also assume that input fraction register 85 has five bit positions, counting J-K flip-flop 87 as part of the input fraction register 85. Assume also that reciprocal fraction register 113 has a 10 digit capacity. Since a binary number having only four digit positions is to be processed, the reciprocal adder-register 47 only requires four full adders and five shift register flip-flops, which is the number illustrated in FIG. 3.

The function of the reciprocal generator of FIG. 3 while operating on the binary word 1011 will be explained in conjunction with FIG. 5A and 5B. The flow diagram of FIG. 4 which is self explanatory illustrates the general operation of the reciprocal generator of FIG. 3.

Pushing the start button on the start control 71 will cause the clock 25 to generate a clock pulse at $t_0$ and so on, and will cause generation of a clear pulse on line 72 that will clear all the flip-flops and registers in the reciprocal generating apparatus of FIG. 3. At $t_1$, or the occurrence of the second clock pulse, start control circuit 71 generates a start pulse enabling, AND gates 75 to 83, thereby loading the binary number 1011 into the input fraction register 85 and J-K flip-flop 87, the most significant digit of the binary number being placed in the most significant digit position of the fraction register.

At the occurrence of the first and second clock pulse at time $t_0$ and $t_1$, as shown in FIG. 5A and 5B, the flip-flops of the reciprocal adder register 47 remain in their cleared state. That is, the one output of $F_c$ flip-flop 103, $F_1$ flip-flop 105, $F_2$ flip-flop 107, $F_3$ flop-flop 109, and $F_4$ flip-flop 111 is a binary zero and the zero output of $F_4$ flip-flop 111 is a binary one. This zero output is used to enable AND gates 91 and 112. J-K flip-flop 115, at the first and second clock times $t_0$ and $t_1$ also has a binary one signal at its zero output, thereby enabling AND gate 63 through the precision control unit if it is used. J-K flip-flop 87, during $t_0$ and $t_1$ has a signal at its zero output that is a binary one which enables AND gate 89 and a binary zero signal at its one output inhibiting AND gates 91 and 63.

Since the binary number 1011 was presented to input fraction register 85 at time $t_1$ in the floating binary point normalized position, input fraction register 85 is loaded with 10110. Since J-K flip-flop 87 is connected to the least significant digit position of input register 85, the input of J-K flip-flop 87 sees a binary one at this time. At the occurrence of the third clock pulse, at $t_2$, therefore, AND gate 89 is enabled and a shift of one position to the right of the binary number 1011 in input fraction register 85 occuts. This shift is also communicated to an exponent register over line 90 wherein the exponent is appropriately modified as previously explained. This shift at time $t_2$ causes another binary one to be placed at the J input of J-K flip-flop 87.

At the occurrence of the fourth clock pulse, therefore, at time $t_3$ the zero output of flip-flop 87 is still one thereby causing AND gate 89 to generate another shift pulse.

Assuming that trailing edge logic is used throughout, at the same time $t_2$, J-K flip-flop 87 changes state causing its one output to generate a binary one and its zero output to go zero. Because flip-flop 87 generated a binary one at its one output at time $t_2$ AND gates 91, 63 and 112 are enabled, AND gates 91 and 112 generating an output pulse because their other inputs are binary ones supplied from the zero output of $F_4$ flip-flop 111 in reciprocal adder-register 47. At time $t_2$ therefore, a binary zero is supplied to $A_1$ adder 95 binary one to $A_2$ adder 97 a binary zero to $A_3$ adder 99 and a binary one to $A_4$ adder 101. The presence of these binary digits in the reciprocal adder register 47 causes outputs $s_2$ of $A_2$ adder 97 to generate a binary one and output $s_4$ of $A_4$ adder 101 to generate a binary one. At this same time AND gate 63 generates a binary one output on lead 22 because it is enabled by the output of flip-flop 87 and the output of flip-flop 115, if no-precision control circuit is used which we shall assume here. A binary one signal on lead 22 or on any lead which is an input to OR gate 51 will cause AND gate 53 to be enabled upon the next clock pulse. At time $t_2$ because AND gate 112 was enabled, the zero output of $F_4$ flip-flop 111, a binary one, appearing at point 37 is placed in the most significant digit position of reciprocal fraction register 113.

At time $t_3$, since $F_2$ flip-flop 107 and $F_4$ flip-flop 111 had binary ones at their S inputs, the fourth clock pulse will cause them to change state, $F_2$ flip-flop 107 generating a binary one at its one output and $F_4$ flip-flop 111 generating a one at its one output and a zero at its zero output. This change of state of $F_4$ flip-flop 111 inhibits AND gates 91 and 112. Therefore, at time $t_3$, $A_3$ adder 99 receives a binary one signal at its $B_3$ input while all the other adders receive binary zero signals at their inputs. As a result of this binary one input on $A_3$ adder 99, it generates a binary one output at its output $s_3$ which is supplied to the S input of $F_3$ flip-flop 109. Also, the binary one in the reciprocal fraction register is shifted to the right in digit position thereby causing register 113 to be holding a zero and a one.

At time $t_4$, at the occurrence of the fifth clock pulse the one output of $F_3$ flip-flop 109 goes to a binary one while the other flip-flops 103, 105, 107 and 111 return to the initial or cleared state. That is, their binary outputs are zero. Since at this time the zero output of $F_4$ flip-flop 111 goes to a binary one, AND gate 91 and 112 are again enabled causing 0101 to be supplied to reciprocal adder register 47 and a binary one to be supplied to the reciprocal fraction register 113. $A_1$ adder, 95 receives a zero at its $a_1$ input, $A_2$ adder 97 receives a one at its $a_2$ input, $A_3$ adder 99 receives a zero at its $a_3$ input, and $A_4$ adder 101 receives a one at its $a_4$ input.

Since $A_4$ adder 101 receives a binary one signal at its $a_4$ input and a binary one signal at its $b_4$ input from $F_3$ flip-flop 109, its $S_4$ output will be a binary zero and its $c_{41}$ output will be a binary one. This can be seen as equivalent to a simple binary addition of two binary ones. The $c_{42}$ output of $A_4$ adder 101 is supplied to the $c_{31}$ input of $A_3$ adder 99 thereby causing the $s_3$ output of $A_3$ adder 99 to be a binary one. At this same time since $A_2$ adder 97 received a binary one at its $a_2$ input, its $s_2$ output will be a binary one.

The outputs of the adders will again be supplied to the S inputs of the flip-flops and upon the occurrence of the sixth clock pulse at time $t_5$ will cause them to change state accordingly as shown in FIG. 5A and 5B.

The process will continue as explained above, the elements of reciprocal adder register 47 assuming the states shown in FIGS. 5A and 5B and the reciprocal fraction register 113 being loaded with the binary bits appearing at the zero output of $F_4$ flip-flop 111 during each clock time.

This process will continue until all the inputs 22, 24, 26, 28, 30 and 32 of OR gate 52 are zero. The inputs 24, 26, 28, 30, and 32 to OR gate 51 become zero when the most significant digit of the first period of the reciprocal of the number loaded into the input fraction register 85 has appeared at the zero output of $F_4$ flip-flop 111. This in our specific example happens at time period $t_{11}$ at the occurrence of the twelfth clock pulse. If AND gate 63 is disenabled at this time, calculation of the reciprocal will stop. However, if AND gate 63 is not disenabled at this time, the reciprocal generator will continue to generate another period of the reciprocal until all the input 22, 24, 26, 28, 30 and 32 are zero.

AND gate 117 and J-K flip-flop 115 will, upon sensing a binary one in the least significant digit position of output register 113, disenable AND gate 63, if no precision control circuit is used. Therefore, it can be seen that the length of the reciprocal fraction register 113 in our particular example or more generally, the digit position of the fraction registers sensed will influence the accuracy of the reciprocal generated. For convenience of illustration, only, one period of the reciprocal of the binary number 1011 has been shown.

This first period as stored in the output fraction register will be .0001011101, reading from the most significant to the least significant digit. That this is the answer can best be illustrated by the contents of the reciprocal fraction register from the time $t_0$ until $t_{11}$.

| Time | MSD | | | | | | | | | LSD |
|---|---|---|---|---|---|---|---|---|---|---|
| $t_0$ | 0 | 0 | 0 | 0 | 0 | 0 | 0 | 0 | 0 | 0 |
| $t_1$ | 0 | 0 | 0 | 0 | 0 | 0 | 0 | 0 | 0 | 0 |
| $t_2$ | 1 | 0 | 0 | 0 | 0 | 0 | 0 | 0 | 0 | 0 |
| $t_3$ | 0 | 1 | 0 | 0 | 0 | 0 | 0 | 0 | 0 | 0 |
| $t_4$ | 1 | 0 | 1 | 0 | 0 | 0 | 0 | 0 | 0 | 0 |
| $t_5$ | 1 | 1 | 0 | 1 | 0 | 0 | 0 | 0 | 0 | 0 |
| $t_6$ | 1 | 1 | 1 | 0 | 1 | 0 | 0 | 0 | 0 | 0 |
| $t_7$ | 0 | 1 | 1 | 1 | 0 | 1 | 0 | 0 | 0 | 0 |
| $t_8$ | 1 | 0 | 1 | 1 | 1 | 0 | 1 | 0 | 0 | 0 |
| $t_9$ | 0 | 1 | 0 | 1 | 1 | 1 | 0 | 1 | 0 | 0 |
| $t_{10}$ | 0 | 0 | 1 | 0 | 1 | 1 | 1 | 0 | 1 | 0 |
| $t_{11}$ | 0 | 0 | 0 | 1 | 0 | 1 | 1 | 1 | 0 | 1 |

The register is zero for the firt two time periods because AND gate 112 is not enabled until the third clock pulse at time $t_2$.

A new and simplified method and apparatus for determining the reciprocal of a binary divisor has thus been disclosed. It should be understood of course that the foregoing disclosure relates to only preferred embodiments of the invention and that numerous modifications or alterations may be made therein or completely different embodiments may be used without departing from the spirit and scope of the invention as set forth in the appended claims. For example, the inherent function of the binary divider of FIG. 1 or the reciprocal generator of FIG. 3 may be performed in a micro-programmable computer which is instructed by appropriate micro-instructions, that are well within the purview of a person of ordinary skill in a micro-program art, to function according to the above described and illustrated procedure.

What is claimed is:

1. An apparatus for forming an arbitrarily precise reciprocal of an odd binary integer comprising:

means for generating a binary number that forms a product of a series of binary ones, *n* times the number of digits in one period of the reciprocal of said odd binary integer long, where *n* is any positive integer, when multiplied by said odd binary integer; and means for stopping said generating means whenever the number of digits in said binary number equals *n* times the number of digits in one period of the reciprocal of said odd binary integer.

2. The apparatus of claim 1 wherein said binary number generating means comprises:

means for multiplying said odd binary integer by consecutive binary digits that form a product that is a finite series of binary ones.

3. The apparatus of claim 2 wherein said multiplying means includes:

means for controlling when said odd binary number is an addend in a series of additions in which the augend for each addition is the sum of the previous addition shifted one digit position.

4. The apparatus of claim 3 wherein said controlling means comprises:

means for sensing the least significant digit in each said augend and generating the inverse of said sensed digit, the inverse of said sensed digit controlling when said odd binary number is the addend for the sensed augend.

5. The apparatus of claim 2 wherein said means for stopping said generating means comprises:

means for storing said consecutive binary digits:

means for detecting a binary one stored in the least significant digit position of said storing means;

means for detecting occurrence of a sub-product of said multiplication that is zero in all its digit positions; and means responsive to said binary one stored and sub-product detecting means for stopping said multiplication means upon both said detecting means having sensed their respective condition.

6. An apparatus for forming a reciprocal of a binary number, comprising:

means for (odd normalizing) altering said binary number (to) into an apparent odd binary integer whenever said binary number is an apparent even binary number, said odd binary integer being expressed as a fraction times an exponent;

means for generating the reciprocal of said exponent;

means for generating a binary number that forms a product that is a finite series of binary ones equal in number to *n* times the number of digits in one period of the reciprocal of said odd binary integer, when multiplied by said odd binary (numbers) integer; and means for stopping said generating means whenever the number of digits in said binary number equals *n* times the number of digits in one period of the reciprocal of said odd binary integer.

7. The apparatus of claim 6 wherein said binary number generating means comprises:

means for multiplying said odd binary integer by consecutive binary digits that form a product that is a series of binary ones.

8. The apparatus of claim 7 wherein said means for stopping said generating means comprises:

means for storing said consecutive binary digits;

means for detecting a binary one stored in the least significant digit position of said storing means;

means for detecting occurrence of a sub-product of said multiplication that has a zero in all its digit positions; and means responsive to said binary one stored and sub-product detecting means for stopping said multiplication means upon both said detecting means have sensed their respective conditions.

9. The apparatus of claim 8 wherein said means for stopping said generating means further comprises:

means responsive to said stored binary one detecting means and predetermined *n* periods to influence said binary one stored and sub-product detecting responsive means upon the predetermined number of periods having occurred.

10. An apparatus for forming the reciprocal of a floating binary point number, comprising:

means for odd normalizing the fractional part of said floating binary point number to an apparent odd binary integer whenever said fractional part is an apparent even binary number;

means for generating the reciprocal of the exponent of said floating binary point number;

means for generating a binary number that forms a product of a series of binary ones equal in number to *n* times the number of digits in one period of the reciprocal of said apparent odd binary integer when multiplied by said apparent odd binary integer; and means for stopping said generating means whenever the number of digits in said binary number equals *n* times the number of digits in one period of the reciprocal of said apparent odd binary integer.

11. The apparatus of claim 10 wherein said binary number generating means comprises:

means for multiplying said apparent odd binary integer by consecutive binary digits that form a product that is a series of binary ones.

12. The apparatus of claim 11 wherein said means for stopping said generating means comprises:

means for storing said consecutive binary digits;

means for detecting a binary one stored in the least significant digit position of said storing means;

means for detecting occurrence of a sub-product of said multiplication that has a zero in all its digit positions;

means responsive to said binary one stored and sub-product detecting means for stopping said multiplication means upon both said detecting means having sensed their respective conditions.

13. Apparatus for dividing a binary dividend by a binary divisor, comprising:

means for altering said binary divisor into an apparent odd binary integer whenever said divisor is an apparent even binary number, said odd binary integer being expressed as a fraction times an exponent;

means for generating the reciprocal of said exponent;

means for generating a binary number that forms a product that is a finite series of binary ones equal in number to *n* times the number of digits in one period of the reciprocal of said apparent odd binary integer, when multiplied by said apparent odd binary integer; and means responsive to said binary number generating means for multiplying said dividend by said binary number as it is being generated, and appropriately manipulating said exponent.

14. The division apparatus of claim 13 further comprising:

means for stopping said multiplying means whenever the number of digits in said binary number equals *n* times the number of digits in one period of the reciprocal of said apparent odd binary integer.

15. The apparatus of claim 14 wherein said binary number generating means comprises:

means for multiplying said apparent odd binary integer by consecutive binary digits that form a product that is a series of binary ones.

16. The apparatus of claim 15 wherein said multiplying means includes:

means for controlling when said apparent odd binary integer is an addend in a series of additions in which the augend for each addition is the sum of the previous addition shifted one digit position.

17. The apparatus of claim 16 wherein said controlling means comprises:

means for sensing the least significant digit in each said augend and generating the inverse of said sensed digit, the inverse of said sensed digit controlling when said apparent odd binary integer is the addend for the sensed augend.

18. The apparatus of claim 13 wherein said multiplying means includes:

means for controlling when said binary dividend is an addend in a series of additions in which the augend for each addition is the sum of a previous addition shifted one digit position.

19. The apparatus of claim 18 wherein said dividend controlling means comprises:

means for sensing the least significant digit in each augend in a series of additions between said apparent odd binary integer and a previous sum and generating the inverse of said sensed digit, the inverse of said sensed digit controlling when said dividend is the addend in a series of additions.

20. An apparatus for forming a floating binary point quotient from a floating binary point divisor and a floating binary point dividend comprising:

means for odd normalizing the fractional part of said floating binary point divisor to an apparent odd binary integer whenever said fractional part is an apparent even binary number;

means for generating the reciprocal of the exponent of said floating binary point divisor;

means for generating a binary number that forms a product that is a finite series of binary ones when multiplied by said apparent odd binary integer;

means responsive to said binary number generating means for multiplying the fractional part of said floating binary point dividend by said binary number as it is being generated; and means for summing the reciprocal of the exponent of said fractional part of said divisor with the exponent of said fractional part of said dividend.

21. The apparatus of claim 20 wherein said binary number generating means comprises:

means for multiplying said apparent odd binary integer by consecutive binary digits to form a product of binary ones.

22. The apparatus of claim 20 wherein said multiplying means includes:

means for storing the product of said multiplication.

23. The apparatus of claim 22 further including:

means for stopping said multiplying means whenever the number of digits in said binary number equals *n* times the number of digits in one period of the reciprocal of said apparent odd binary integer.

24. The apparatus of claim 23 wherein said stopping means comprises:

means for detecting a binary one stored in the least significant bit position of said storing means;

means for detecting occurrence of a sub-product of said binary divisor and a consecutive binary digit that is zero in all its digit positions;

means responsive to said binary one stored and sub-product detecting means for stopping said multiplication means upon both said detecting means having sensed their respective conditions.

* * * * *

UNITED STATES PATENT OFFICE
CERTIFICATE OF CORRECTION

Patent No. 3,777,132 Dated December 4, 1973

Inventor(s) Walter Scott Bennett, Jr.

It is certified that error appears in the above-identified patent and that said Letters Patent are hereby corrected as shown below:

Column 1, line 42, "R. R. Goldschmidt" should read -- R. E. Goldschmidt --. Column 13, line 10, "occuts" should read --occurs--; line 28, after "95", insert --a-- ; line 64, "gate" should read --gates--. Column 14, line 67, insert a --.-- before the first "O". Column 18, line 46, "bit" should read -- digit --

Signed and sealed this 4th day of June 1974.

(SEAL)
Attest:

EDWARD M.FLETCHER,JR.
Attesting Officer

C. MARSHALL DANN
Commissioner of Patents

UNITED STATES PATENT OFFICE
CERTIFICATE OF CORRECTION

Patent No. 3,777,132 Dated December 4, 1973

Inventor(s) Walter Scott Bennett, Jr.

It is certified that error appears in the above-identified patent and that said Letters Patent are hereby corrected as shown below:

In the claims, column 15, line 66, delete "(odd normalizing)"; line 67, delete "(to)". Column 16, line 8, delete "(numbers)".

Signed and sealed this 5th day of November 1974.

(SEAL)
Attest:

McCOY M. GIBSON JR.
Attesting Officer

C. MARSHALL DANN
Commissioner of Patents